United States Patent [19]

Stern

[11] 3,875,342

[45] Apr. 1, 1975

[54] PERMANENT SIGNAL LOCKOUT CIRCUIT FOR CROSSBAR SWITCHING SYSTEMS

[75] Inventor: Mark Charles Stern, New York, N.Y.

[73] Assignees: American Telephone and Telegraph Company; Western Electric Company, both of New York, N.Y.

[22] Filed: Nov. 5, 1973

[21] Appl. No.: 412,635

[52] U.S. Cl. .......... 179/18 F
[51] Int. Cl. .......... H04m 3/12
[58] Field of Search .......... 179/18 F, 19

[56] References Cited

UNITED STATES PATENTS

| | | | |
|---|---|---|---|
| 3,378,642 | 4/1968 | Gagnier et al. | 179/18 F |
| 3,699,265 | 10/1972 | Altenburger | 179/18 FA X |
| 3,705,959 | 12/1972 | Swanson | 179/18 F |

*Primary Examiner*—William C. Cooper
*Attorney, Agent, or Firm*—H. R. Popper; E. J. Olinder

[57] ABSTRACT

A permanent signal line lockout arrangement for crossbar switching systems is disclosed in which a silicon controlled rectifier (SCR) is inserted in series with the operate path of the line relay. When a customer lifts his handset to initiate a dial tone service request, the on-hook to off-hook transition triggers the SCR into conduction by means of a capacitive coupling network, and the line relay operates through the SCR. When a permanent signal condition is detected, the line is connected to a permanent signal holding trunk that is modified to remove the holding ground from the sleeve lead. Removal of the ground releases the hold magnet which thereupon reconnects the line relay to the permanent signal line. However, because the capacitor coupling network became charged when the sleeve lead holding ground was present, the SCR is not retriggered by the on-hook to off-hook transient that results when the line relay is reconnected. The line is thus held out of service for the duration of the permanent signal condition without need to maintain any switching connection to a permanent signal trunk.

9 Claims, 1 Drawing Figure

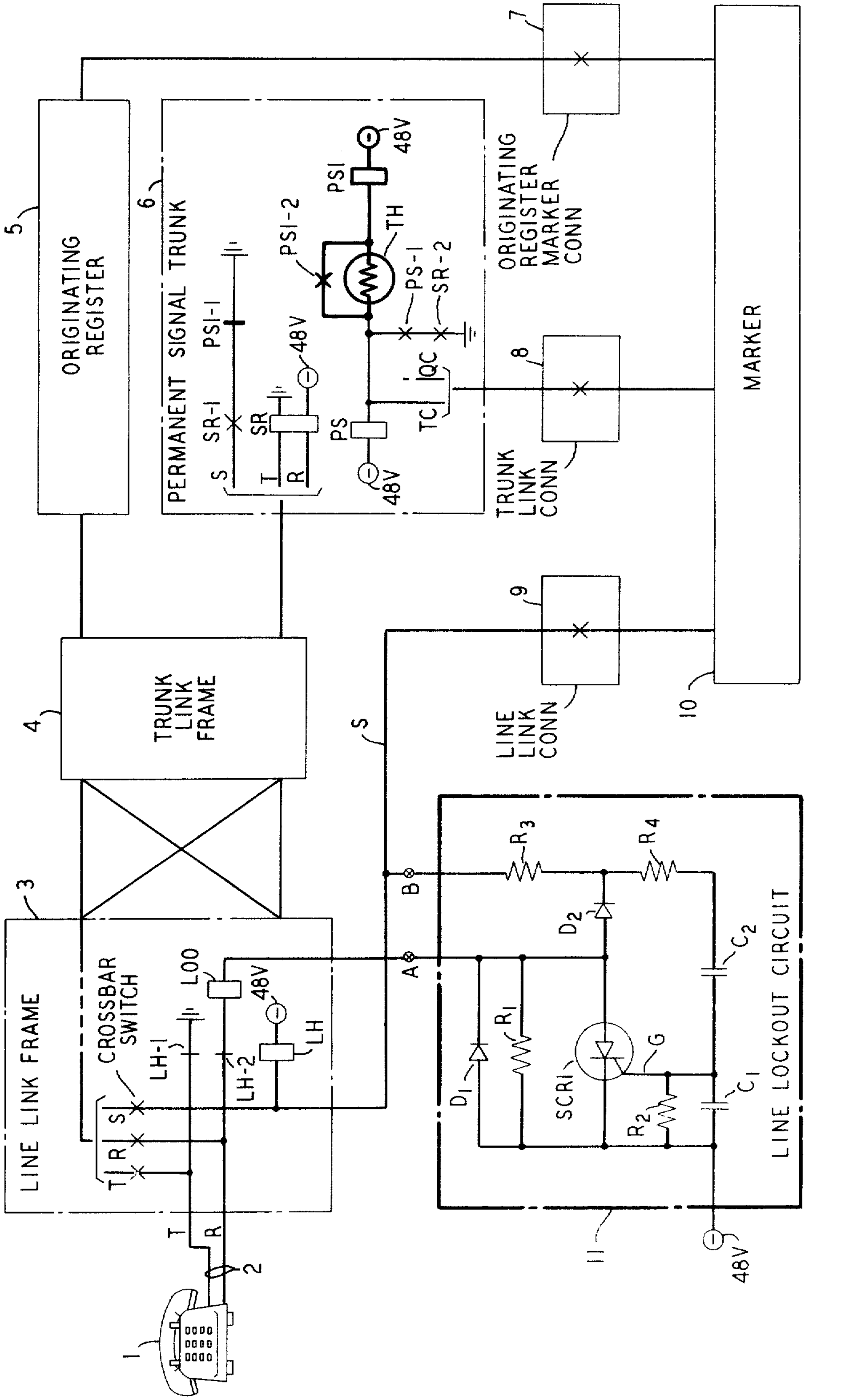
ORIGINATING REGISTER
PERMANENT SIGNAL TRUNK
ORIGINATING REGISTER MARKER CONN
TRUNK LINK CONN
LINE LINK CONN
MARKER
TRUNK LINK FRAME
LINE LINK FRAME
CROSSBAR SWITCH
LINE LOCKOUT CIRCUIT
PSI-1
PSI-2
PSI
TH
PS-1
SR-2
SR-1
SR
PS
TC
QC
LH-1
LH-2
LH
LOO
SCRI
48V
R3
R4
R1
R2
D1
D2
C1
C2
G
A
B
S
T
R

PERMANENT SIGNAL LOCKOUT CIRCUIT FOR CROSSBAR SWITCHING SYSTEMS

BACKGROUND OF THE INVENTION

This invention relates to the handling of permanent signal lines in communication systems and, in particular, to arrangements for treating permanent signal lines in crossbar switching systems.

Permanent signal conditions are off-hook signals that persist, in the absence of dialing, beyond the time which is normally allotted for dialing. These signals may arise for a variety of reasons, for example, unintentional or deliberate removal of the handset from its cradle by a customer, cable failures, or individual line wire failures. The volume of permanent signal traffic due to the foregoing and other causes has increased greatly in the last few years and has caused serious problems in many switching systems.

Crossbar switching systems typically handle permanent signal lines by connecting the lines through the switching network to a permanent signal holding trunk. The switching network must be used to connect the lines to the trunks, therefore, permanent signal conditions on a small percentage of the system's total line capacity can reduce the switching capacity of a system and adversely affect telephone service.

Prior art circuits are available which can remove from service those lines that exhibit permanent signal conditions until after an on-hook signal is recognized from the associated station. One of the disadvantages of these circuits is that they require either a special lockout relay and its associated mechanical contacts or a combination of crossbar switch levels including mechanical contacts. Consequently, it is rather expensive to equip a system for line lockout protection because of the need to use an extra lockout relay for each line circuit and because of the complex rewiring which is necessary to provide lockout service by other arrangements. It is apparent that a need exists for a line lockout arrangement which can service permanent signal traffic by removing it from the switching system without requiring an expensive per line lockout relay or complex rewiring of the crossbar switch levels. In addition, it would be advantageous to provide such lockout service with a device that is completely electronic, thus avoiding maintenance problems associated with mechanical contacts. Accordingly, it is an object of the present invention to provide a line lockout arrangement which can service permanent signal conditions without requiring a connection through the switching network.

It is another object of the present invention to provide line lockout service without the use of a special per-line relay.

It is a further object of the present invention to provide a completely electronic line lockout arrangement.

SUMMARY OF THE INVENTION

The foregoing and other objects are achieved in accordance with the principles of the present invention in one illustrative embodiment thereof wherein lockout protection is provided in a crossbar switching system by means of a line lockout circuit which is inserted in series with the operating path of the line relay. Specifically, the line lockout circuit includes a silicon controlled rectifier (SCR) which is connected in series with the line relay. Therefore, the line relay cannot operate unless the associated station set is off-hook and the SCR is conducting. During normal operation, a customer who is initiating a dial tone service request causes an on-hook to off-hook transition which triggers the SCR by means of a capacitive coupling network. The line relay thereupon operates over the path including the loop closure in the station set and the SCR.

When a permanent signal condition is later detected, the crossbar switching system connects the permanent signaling line to a permanent signal holding trunk in a normal manner. The holding trunk, however, is modified in accordance with one aspect of the illustrative embodiment to remove the holding ground on its sleeve lead shortly after the trunk is seized. Removal of the ground causes the network connections between the permanent signaling line and the holding trunk to be released and, in particular, the hold magnet in the line link frame releases, causing the permanent signaling line to be reconnected to its associated line relay. The reconnection of the line relay generates an on-hook to off-hook transition, however, this transition does not retrigger the SCR because the capacitive coupling network was previously charged when the holding ground was present. Since the SCR is not retriggered, the line relay cannot reoperate even though it is connected to the permanent signaling line. The circuit remains in this state until the permanent signal condition is removed from the line. When this happens, the capacitive coupling network discharges and a subsequent on-hook to off-hook transition produced by a service request will trigger the SCR, causing the line relay to operate.

BRIEF DESCRIPTION OF THE DRAWING

A single sheet of drawing discloses a specific illustrative embodiment of a line lockout circuit arrangement according to the principles of my invention as incorporated in a crossbar switching system of the type described in U.S. Pat. No. 2,585,904, issued to A. J. Busch on Feb. 19, 1952.

DETAILED DESCRIPTION

In the drawing, a crossbar switching system of the type described in the aforementioned Busch patent is shown. The system has been modified by the addition of a line lockout circuit in accordance with my invention to provide improved line lockout service. As shown, station set 1 is connected to line link frame 3 of the system via line 2 which includes tip conductor T and ring conductor R. Line link frame 3 and trunk link frame 4 act together as a switching network to provide switching capabilities under the control of common marker 10. Crossbar switch operation is well known and is described, inter alia, in the aforementioned Busch patent.

Originating register 5 and permanent signal holding trunk 6 appear on the trunk link frame 4 in the usual manner so that station set 1 may be connected to register 5, permanent signal trunk 6, or other call processing facilities (not shown) via line link frame 3 and trunk link frame 4 operating under control of marker 10 in conjunction with line link connector 9, trunk link connector 8 and originating register marker connector 7.

Line link frame 3 contains the usual crossbar switch mechanisms, hold magnets and line relays associated with each incoming line, such as line 2. In particular, line relay LOO and hold magnet LH are associated with line 2. The relays and hold magnets correspond to the line relay arrangements disclosed in FIG. 5 of the Busch patent.

In the usual crossbar switch configuration, the right-hand side of the winding of line relay LOO would be connected directly to negative battery. However, line 2 is provided with line lockout protection in accordance with the principles of my invention by the insertion of line lockout circuit 11 between the right-hand side of the winding of line relay LOO (at terminal A) and negative battery. In addition, lockout circuit 11 is connected to sleeve lead S by means of terminal B. Lockout circuit 11 comprises a silicon controlled rectifier, SCR1, which is connected in series with line relay LOO and negative battery in order to control the operation of line relay LOO. The winding of line relay LOO is coupled to gate electrode G of silicon controlled rectifier SCR1 by diode D2, resistor R4 and capacitor C2. This path is provided for control signals which trigger device SCR1 into a conducting state to operate line relay LOO. In addition, gate electrode G is coupled to sleeve lead S by capacitor C2 and resistors R4 and R3 in order to receive signals on sleeve lead S which block the triggering control signal as hereinafter described and prevent line relay LOO from reoperating during a permanent signal condition. Diode D1, resistors R1 and R2, and capacitor C1 are provided in the illustrative embodiment to reduce the effects of noise on the operation of lockout circuit 11. Diode D1 protects lockout circuit 11 against voltage surges such as lightning hits. Resistor R1 compensates for leakage currents on line 2. Capacitor C1 and resistor R2 prevent noise from triggering device SCR1.

A permanent signal condition which results in the operation of my illustrative lockout circuit begins when line 2 changes from its on-hook, or idle state, to an off-hook, or service requesting state. This change may be caused by several different reasons, for example, an unintentional or intentional off-hook at the station set 1 or a false ground on station line 2. However, the actual reason is not important for an understanding of my invention. An off-hook signal on line 2 results in a bridging of conductors T and R, and the completion of a path from ground, contact LH-1, conductor T, the loop closure, (caused by the off-hook signal) conductor R, contact LH-2, the winding of line relay LOO to terminal A of line lockout circuit 11. Prior to the off-hook signal and the appearance of ground at terminal A, negative battery potential is established at the right lead of capacitor C2 via the path from capacitor C2, resistor R4, resistor R3, sleeve lead S, the winding of hold magnet LH to negative battery. In addition negative battery potential is established on the left lead of capacitor C2 by resistor R2. Thus capacitor C2 is discharged because it has negative battery on both of its leads. When ground appears at terminal A, capacitor C2 begins charging through diode D2 and resistor R4. The charging current runs primarily into the gate electrode G of device SCR1 and is sufficient to trigger device SCR1 into a conducting state. Line relay LOO thereupon operates over the path from ground, contact LH-1, conductor T, the loop closure, conductor R, contact LH-2, winding of line relay LOO, terminal A, and device SCR1 to negative battery.

In operating, relay LOO initiates circuit actions as described in the aforementioned Busch patent at column 6, lines 46 et seq., whereby station 1 is connected to originating register 5 via frames 3 and 4 under control of marker 10. During the completion of the connection between register 5 and station 1, marker 10 operates hold magnet LH in line link frame 3 via line link connector 9 and sleeve lead S as described in the Busch patent to open hold magnet contacts LH-1 and LH-2. Since its operate path is disrupted, line relay LOO releases and, as the current flowing through the windings of line relay LOO decreases to zero, device SCR1 reverts back to its nonconducting state. Concurrently, marker 10 passes calling line designation information (equipment location, class of service information, etc.) to register 5 for storage. After checking the established connections, marker 10 releases to serve other calls. Register 5 then returns dial tone to station 1 in a manner described in the Busch patent as a signal to begin dialing a called number.

When a permanent signal condition occurs, a called number is not received in register 5. Accordingly, register 5 times out in a well-known manner and subsequently re-engages marker 10 via originating register marker connector 7 in order to inform marker 10 of the permanent signal condition. This operation is described in the Busch patent at column 186, lines 68 et seq. Marker 10 receives the calling line designation information for station 1 from register 5 and subsequently controls the release of the connections from register 5 to line 2. As described in the Busch patent at column 187, lines 27 et seq., marker 10 proceeds to select a permanent signal holding trunk. I have shown a permanent signal holding trunk 6 which has, however, been specially modified in accordance with my invention as shown by the heavy lines.

When permanent signal trunk 6 is connected via frames 3 and 4 to line 2, supervisory relay SR in trunk 6 operates over the path from ground, the upper winding of relay SR, connections in frames 3 and 4, conductor T, the permanent signal loop closure, conductor R, connections in frames 3 and 4, and the lower winding of relay SR to negative battery. The operation of supervisory relay SR closes contact SR-1 to ground sleeve lead S through contact PS1-1 (closed because relay PS1 is not operated). Ground on sleeve lead S at permanent signal trunk 6 holds the established connections in frames 3 and 4 under control of supervisory relay SR. In addition, the ground on sleeve lead S holds hold magnet LH in frame 3 operated, thereby opening contacts LH-1 and LH-2 to disconnect line relay LOO from line 2 in order to prevent further service requests from line relay LOO. The ground on sleeve lead S also appears at terminal B of line lockout circuit 11 and charges capacitor C2 over the path including resistors R3 and R4, capacitor C2, and resistor R2 to negative battery. The right-hand lead of capacitor C2 is held at ground by the ground on sleeve lead S.

Concurrently, marker 10, as described in the Busch patent at column 187, lines 27 et seq., controls permanent signal trunk 6, via trunk link connector 8 and leads TC, QC and other leads (not shown), to perform various operations including applying a high tone to line 2 in order to inform a customer at line 2 that a permanent signal condition has occurred. Specifically, marker 10 grounds lead TC to operate relay PS. Upon operating, relay PS locks to ground over the obvious path from negative battery, the winding of relay PS, contact PS-1 and contact SR-2 (closed by operated relay SR) to ground. Operated relay PS bridges a high tone generator (not shown) onto line 2 by means of other contacts (not shown). Marker 10 then releases to serve other calls.

Under normal permanent signal operation, permanent signal trunk 6 would remain connected to line 2 until the permanent signal condition was removed. However, permanent signal trunk 6 has been modified in accordance with the principles of my invention by the addition of the circuitry shown in heavy lines. Specifically, relay PS1 has been added in parallel with relay PS. However, relay PS1 does not operate simultaneously with relay PS because of thermistor TH which is in series with the winding of relay PS1. After a predetermined time following the operation of relay PS, relay PS1 operates and locks to ground over the path from negative battery, the winding of relay PS1, bridging contacts PS1-2, contact PS-1, and contact SR-2 to ground. Upon operating, relay PS1 opens contact PS1-1 removing ground from sleeve lead S.

Removal of ground from sleeve lead S causes the connections between line 2 and trunk 6 to be released. When these connections are released, supervisory relay SR releases since it is no longer connected to the loop closure on line 2. The release of relay SR opens contact SR-2 which breaks the locking path for relays PS and PS1 causing both of them to release. Permanent signal trunk 6 thus reverts to its idle state.

The removal of ground from sleeve lead S also allows capacitor C2 in line lockout circuit 11 to begin discharging through resistors R4 and R3 and the winding of hold magnet LH to negative battery. However, since the time constant determined by C2 (R3 + R4) is large, hold magnet LH releases (because of the absence of ground on sleeve lead S) before capacitor C2 can discharge appreciably. The release of hold magnet LH closes contacts LH-1 and LH-2 reconnecting line relay LOO to line 2. If line 2 is still in a permanent signaling condition, conductors T and R remain bridged, ground reappears at terminal A, and capacitor C2 begins recharging via diode D2 and resistor R4. However, since capacitor C2 is only slightly discharged, the charging current is insufficient to trigger device SCR1 into conduction. Consequently, line relay LOO cannot operate even though it has been reconnected to permanent signaling line 2 because it has no low impedance path to negative battery (resistor R1 is chosen so that the current passing through R1 is insufficient to operate line relay LOO).

Line 2 remains in this state until the permanent signal condition has been eliminated by removing the bridge on conductors T and R. When this bridge is removed, ground is removed from terminal A of line lockout circuit 11 and consequently capacitor C2 discharges through resistor R4, resistor R3, sleeve lead S and the winding of hold magnet LH to negative battery. Thus lockout circuit 11 returns to its idle state.

In the illustrative embodiment shown, the following component values may be used: R1, 11,000 ohms; R2, 2,220 ohms; R3, 220,000 ohms; R4, 24,000 ohms; C1, 3.3 microfarads; C2, 1 microfarad.

It is to be understood that the above-described arrangements are illustrative of the application of principles of my invention. Numerous other arrangements may be devised by those skilled in the art without departing from the spirit and scope of my invention.

What is claimed is:

1. A permanent signal lockout arrangement for a crossbar switching system having a line relay for monitoring the switchhook status of a telephone line to initiate service requests and a hold magnet including contacts for disconnecting said line relay from said telephone line during the setup of switching connections, said lockout arrangement comprising, blocking means in series with said line relay, said blocking means triggerable to complete an operating path for said line relay, coupling means responsive to an on-hook to off-hook transition appearing on said telephone line at said line relay for triggering said blocking means to allow said line relay to operate responsive to an off-hook signal on said telephone line at said line relay, said switching system subsequently operating said hold magnet to disconnect said line relay and to release said blocking means, means for releasing said switching connections and said hold magnet upon detection of a permanent signal condition on said telephone line, and means for preventing said coupling means from retriggering said blocking means in response to the apparent on-hook to off-hook transition at said line relay which results when said hold magnet releases and reconnects said line relay to said telephone line having said permanent signal condition, whereby said line relay remains released for the duration of said permanent signal condition.

2. A lockout arrangement according to claim 1 wherein said blocking means includes an electronic device having a first switch terminal connected to said line relay and a second switch terminal connected to a power source and a gate terminal for receiving a trigger signal to cause said electronic device to set up a low impedance path between said first and said second switch terminals, whereby said line relay is connected to said power source.

3. A lockout arrangement according to claim 2 wherein said electronic device is a silicon controlled rectifier.

4. A lockout arrangement according to claim 2 wherein said coupling means includes a capacitor responsive to said on-hook to off-hook transition at said line relay for producing said trigger signal.

5. A' lockout arrangement according to claim 4 wherein said means for preventing said coupling means from retriggering includes a charging circuit connected to said hold magnet and said capacitor for charging said capacitor when said hold magnet operates in order to prevent said capacitor from responding to said on-hook to off-hook transition at said line relay.

6. a line lockout circuit for a crossbar switching system including a station set having an idle state and a service requesting state, a line relay responsive to said service requesting state for initiating the setup of switching connections in said crossbar system, and a hold magnet operable to establish said switching connections, said hold magnet being released on detection of a permanent signal condition, said lockout circuit comprising, control means inserted in series with the operate path of said line relay operable to complete said operate path, and coupling means responsive to a transition at said station set from an idle state to a service requesting state for operating said control means, and responsive to the operation of said hold magnet for inhibiting the operation of said control means for a predetermined time interval after said permanent signal condition is removed.

7. A line lockout circuit according to claim 6 wherein said coupling means includes a capacitor connected to said control means and said line relay, said capacitor being responsive to said transition at said station set from said idle state to said service requesting state for generating a trigger signal to operate said control means.

8. A line lockout circuit according to claim 7 wherein said coupling means further includes a charging circuit connecting said capacitor to said hold magnet for charging said capacitor to prevent said capacitor from generating said trigger signal when said hold magnet releases.

9. A circuit for preventing the line relay of a line circuit from repeatedly initiating a service request when said line circuit is associated with a permanent signaling line said circuit comprising gate-controlled switching means having an anode, a cathode, and a gate terminal, said anode and said cathode terminal being in circuit with said line relay and a source of potential, transition signal detecting means in circuit with said line relay and said gate terminal for triggering said gate-controlled switching means to complete an operate path for said line relay when said line associated with said line circuit undergoes an on-hook to off-hook transition, and means for reducing the sensitivity of said transition signal detecting means after a permanent signal condition has been detected and for restoring the sensitivity of said transition signal detecting means upon the detection of an on-hook signal on said associated line following said permanent signal condition.

* * * * *